United States Patent [19]

Stautzenberger

[11] 3,907,972

[45] Sept. 23, 1975

[54] ABSORBING SO₂ WITH POLYACRYLIC ACID SOLUTION

[75] Inventor: Adin Lee Stautzenberger, Corpus Christi, Tex.

[73] Assignee: Celanese Corporation, New York, N.Y.

[22] Filed: Apr. 30, 1973

[21] Appl. No.: 355,995

[52] U.S. Cl. .................. 423/243; 423/575; 55/73
[51] Int. Cl.² .......................................... C01B 17/00
[58] Field of Search ...................... 423/242–244, 423/575; 55/73

[56] References Cited
UNITED STATES PATENTS

| | | | |
|---|---|---|---|
| 2,031,802 | 2/1936 | Tyrer et al. | 423/243 |
| 2,134,482 | 10/1938 | Johnstone | 423/243 |
| 3,350,165 | 10/1967 | Marcheguet et al. | 423/243 |
| 3,598,529 | 8/1971 | Deschamps et al. | 423/575 |
| 3,832,454 | 8/1974 | Renault et al. | 423/575 |

*Primary Examiner*—Oscar R. Vertiz
*Assistant Examiner*—Gregory A. Heller

[57] ABSTRACT

In the recovery of sulfur dioxide ($SO_2$) from an $SO_2$-containing gas by contacting said gas with an aqueous absorbing solution, thereafter treating said solution to remove the $SO_2$ therefrom at least in part, and recycling the $SO_2$-freed absorbing solution, the improvement which comprises employing as said absorbing solution an aqueous solution of a polyalkenoic acid such as polyacrylic acid or polymethacrylic acid of a molecular weight of at least about 200. Preferably the molecular weight of the polyalkenoic acid is below about 6000 and the pH of the solution is about 3.2 to 4. The $SO_2$ is removed from the absorbing solution almost quantitatively with $H_2S$, sulfur being produced in the reaction.

6 Claims, No Drawings

ABSORBING $SO_2$ WITH POLYACRYLIC ACID SOLUTION

This application relates to an improved process for the recovery of sulfur dioxide ($SO_2$) from an $SO_2$-containing gas.

Gas mixtures containing small amounts of undesired $SO_2$ are encountered frequently in commerce. The $SO_2$ may complicate further reactions in which the gas mixture is involved or it may pose a pollution problem if the gas is vented to the atmosphere. Accordingly processes have been devised to remove $SO_2$ from such gas mixtures by absorption in suitable liquids, e.g. aqueous solutions of alkali hydroxides of alkali sulfites. In British Pat. No. 400,998 there is described a process for absorption of $SO_2$ from gases derived from roasting sulfide ores, the process involving salts of lactic, glycollic, citric or orthophosphoric acid. After being used for a substantial period of time the solution is withdrawn and boiled to evolve concentrated $SO_2$ and regenerate the absorbent solution.

J. B. Rosenbaum et al. of the U.S. Bureau of Mines, in a paper presented at the American Institute of Mining Engineers Environmental Quality Conference in Washington, D. C. on June 7–9, 1971, reported in Chemical & Engineering News of June 14, 1971, disclose an absorption process especially useful for removing $SO_2$ from gas mixtures obtained in ore smelting operations, fossil fuel power plants and chemical processes. The absorbent is aqueous sodium citrate which is passed countercurrent to the gas to be cleaned. The $SO_2$-containing solution is then reacted with hydrogen sulfide ($H_2S$) in a closed vessel to precipitate elemental sulfur, which is separated. The citrate solution is then recycled.

While such a process should operate satisfactorily, it is relatively expensive because of the cost of citric acid. Other acids mentioned in British Patent 400,998 also have drawbacks for other reasons such as price, volatility, reactivity with $H_2S$, chemical instability, etc.

There is also known, as described in German Offenlegungsschrift No. 1,910,127 of September 18, 1969, a process for reacting $H_2S$ and $SO_2$ at elevated temperature (e.g., about 130°C) in a non-aqueous solution of an alkali or alkaline earth metal salt of an organic acid or acid ester to form elemental sulfur. This process requires operation at high temperature, even in the presence of the metal salts which are evidently catalysts for the Claus reaction.

It is accordingly an object of the present invention to provide an absorption process for removing $SO_2$ from gas mixtures which is characterized by low cost, high efficiency, and easy operability at low (e.g., ambient) temperatures when solutions of $SO_2$ in the improved absorbent solutions which will be described and which are also a part of this invention are reacted with $H_2S$ to form elemental sulfur.

These and other objects and advantages are realized in accordance with the present invention pursuant to which there is employed an absorbing solution, in a process of the character described, which comprises an aqueous solution of a polyacid comprising predominantly at least one member of the polyalkenoic acid group consisting of polyacrylic acid, polymethacrylic acid, and copolymers of acrylic acid and methacrylic acid. The polyacid may, if desired, include minor amounts of other comonomers such as, for example, maleic acid or vinyl acetate, but advantageously the polyacid comprises at least about 80 percent by weight of polymers of acrylic acid, methacrylic acid (particularly 2-methacrylic acid), or mixtures of these two monomers. The polymeric acid preferably has a molecular weight of at least about 200. The molecular weight may be as high as 200,000 or more, but it has been discovered that frothing problems are minimized if the molecular weight is not more than about 6000. Thus, particularly preferred molecular weights of the polyacid are about 200 to 6000.

In preparing the polyacids for use in the present process, the monomeric precursors, e.g., acrylic acid, 2-methacrylic acid, or mixtures of one or both of these with minor amounts of another comonomer, are polymerized in any of the conventional manners already known to the art. For example, polymerization can be affected with redox catalysts; any of the commercially-available catalysts are suitable, as are any of the commercially-available grades of acrylic acid or methacrylic acid.

Advantageously the absorbent solution containing the polymeric acid described above is employed at a pH ranging from about 3.2 to about 4 which can be attained by partially neutralizing the polymeric acid with a base such as a hydroxide or carbonate of alkali metal or of ammonia. Although the concentration of polymeric acid in the aqueous solution is not critical, concentrations of about 5 to 50 percent by weight (based on weight of the organic material and the solvent and not including any metal components which may be present, for example, as a result of adding alkaline materials for buffering purposes) are suitable, with concentrations of about 10 to 30 percent being particularly useful. Other substances such as buffers, metal ions present as partial salts of the polymeric acid, surface active agents, and the like may also be present although they are not essential in the basic practice of the invention.

The following further discussion of the employment of the invention will be directed primarily to using polyacrylic acid itself as the polymeric acid in the absorbent solution inasmuch as polyacrylic acid is in fact entirely satisfactory for the purpose and readily obtainable. It will be understood that polymethacrylic acid, copolymers of methacrylic and acrylic acids, and copolymers of either or both of these monomers with minor amounts of another monomer such as vinyl acetate or maleic anhydride can also be employed if desired.

The solution may be used to absorb $SO_2$ from the gas at ambient temperature as well as at higher or lower temperatures although the solubility of $SO_2$ is, of course, greater at lower temperatures down even to the freezing point of the solution. Solution temperatures between about 20°C and about 70°C are, however, especially useful with super-atmospheric pressures resulting in improved absorption efficiency especially at the higher temperatures. In this connection it will be realized, of course, that there is no upper limit of applicable absorption pressure, since the only effect of increasing pressure is to enhance absorption efficiency. Even at atmospheric pressure the absorption process is quite efficient, especially at temperatures in the range of about 50°C and below.

When the absorbent solution has become saturated with $SO_2$ to such a degree that incomplete absorption of the $SO_2$ becomes evident as indicated by an increase in $SO_2$ content of the gas leaving the absorption step, the solution is withdrawn in whole or in part for regeneration. If the object of the process is simply to remove $SO_2$ from the gas which is being scrubbed by the absorbent solution, followed by subsequent recovery of the absorbed $SO_2$ for use as such, it will be understood that recovery of the absorbed $SO_2$ and regeneration of the absorbent solution for recycle to the absorber can be accomplished simply by heating the $SO_2$-containing solution to a temperature at which free $SO_2$ is evolved therefrom in accordance with methods widely employed in the art for regenerating gas-scrubbing absorbent solutions. However, it is particularly advantageous to convert the absorbed $SO_2$ to elemental sulfur by bringing the $SO_2$-containing solution into contact with hydrogen sulfide, whereby a chemical reaction takes place between the hydrogen sulfide and the $SO_2$ to form elemental sulfur and water. The polyacrylic acid-type solutions of the present process are unexpectedly useful for this reaction, inasmuch as, in these solutions, the reaction takes place with surprising speed and efficiency even at ambient temperatures (i.e., temperatures in the range of 20°C or 30°C). Higher temperatures up, for example, about 130°C can be employed, of course, if desired, with no ill effect, the only effect of elevated temperature being to accelerate the reaction. Advantageously the reaction is conducted at temperatures between about 20°C and about 100°C under at least sufficient pressure to maintain the aqueous component of the reaction system in the liquid phase. Highly elevated pressures have no ill effect, but the reaction can easily be carried out at atmospheric pressure.

The elemental sulfur produced in the reaction between the sulfur dioxide and the hydrogen sulfide precipitates rapidly as a solid, which is then readily removed from the solution by filtration, froth flotation, or melting of the sulfur followed by decantation of the liquid sulfur. Any hydrogen sulfide remaining in the liquid after the above-described reaction step may then advantageously be removed from the solution, as by simple heating to cause its evolution therefrom, before recycle to the absorption step of the process. The regenerated solution, after addition of make-up polyacrylic acid and/or adjustment of the pH if needed, is then recycled for further use in the absorption step.

In carrying out the process it is possible, if desired, to employ two absorption-reaction vessels containing the polyacrylic acid solution, the vessels being arranged in parallel with one being on stream in the absorption step of the process while the other is undergoing regeneration either by simple heating to strip the dissolved $SO_2$ from the solution or else by carrying out the reaction between hydrogen sulfide and $SO_2$ as described above. Alternatively, a single absorption vessel may be used in a continuous process, the $SO_2$-containing gas being passed upwardly therethrough countercurrent to a descending stream of the absorption solution which is then withdrawn from the bottom of the vessel and passed through a continuously operating regenerating vessel from which the regenerated solution is then withdrawn continuously and recycled to the absorption vessel.

The following examples are given to illustrate the invention further; it will be recognized that many departures therefrom can be made within the scope of the invention.

EXAMPLE I

Polyacrylic acid (i.e., a polymer of acrylic acid itself rather than of an equivalent such as methacrylic acid as mentioned hereinabove) having a molecular weight of 3500 was dissolved in water to form an aqueous solution containing 25 weight percent of the polymer. Sodium hydroxide was then added to the aqueous solution until the pH was 3.6.

The buffered polyacrylic solution prepared as described above was then continuously introduced into the top of a glass scrubbing column which was 1 inch in inside diameter and 26 inches tall, packed with ceramic Berl saddles, at a rate of 1.3 ml per minute. Countercurrent to the absorbent solution passing downwardly through the column there was introduced continuously into the bottom of the column 100 ml per minute of air containing 2% $SO_2$ by volume. Pressure within the column was substantially atmospheric (i.e., very slightly above atmospheric), and the temperature of the absorbent solution and the $SO_2$-containing air being introduced into the column was approximately 25°C.

The effluent gas continuously discharged from the top of the column was essentially free of $SO_2$, more than 98 percent of the $SO_2$ contained in the inlet air having been removed by the absorbent solution in the column. From the bottom of the column, absorbent solution containing the dissolved $SO_2$ was continuously withdrawn into a suitable receiver vessel.

The $SO_2$-containing solution withdrawn from the absorption column as above was placed in a stirred closed vessel at atmospheric pressure and at a temperature of about 25°C under an atmosphere of $H_2S$. Elemental sulfur was formed rapidly in the agitated solution in the vessel and, after a reaction period of approximately 30 minutes, approximately 99 percent of the $SO_2$ initially contained in the absorbent solution withdrawn from the scrubber had been converted to elemental sulfur as determined by filtering the solid elemental sulfur from the solution followed by water-washing, drying, and weighing.

When the absorption column was operated as above except with the flow rate of the air-$SO_2$ gas mixture being increased to a rate of 200 ml per minute, the efficiency of absorption of the $SO_2$ was somewhat reduced but was still in excess of 80 percent.

EXAMPLE II

The process of Example I is repeated with polyacrylic acid of about 25,000 molecular weight. The results are substantially the same except that bubbling of the air through the absorption solution produces frothing so that vessels of somewhat larger volume are required to contain the liquid and means to prevent carryover of liquid with the effluent gases become helpful to the process.

The same process using acetic acid in place of polyacrylic acid results neither in satisfactory $SO_2$ absorption nor in a satisfactory conversion of $SO_2$ to sulfur upon bubbling in of $H_2S$. Similarly, succinic, glycollic, formic, tartaric, malic and lactic acids are unsatisfactory. Epoxysuccinic acid is somewhat effective but is prone to hydrolysis upon repeated use and its cost is about twice that of polyacrylic acid. Oxydiacetic acid also is operable but is prone to hydrolysis and necessitates use of the more expensive potassium salt for pH adjustment since the sodium salt is insoluble in the desired pH range. Tripolyphosphoric acid is fairly well suited for $SO_2$ absorption but it is unstable at acid pH's over prolonged periods of time.

It will be appreciated that the instant specification and examples are set forth by way of illustration and not limitation, and that various modifications and changes may be made without departing from the spirit and scope of the present invention.

The embodiments of the invention in which an exclusive property or privilege is claimed are defined as follows:

1. In the recovery of sulfur dioxide ($SO_2$) from an $SO_2$-containing gas with an aqueous absorbing solution, thereafter treating said solution to remove the $SO_2$ therefrom at least in part followed by re-cycling the $SO_2$-freed absorbing solution, the improvement which comprises employing as said absorbing solution an aqueous solution of a polyacid of a molecular weight of at least about 200 and comprising predominantly at least one member of the group consisting of polyacrylic acid, polymethacrylic acid, and copolymers of acrylic acid and methacrylic acid.

2. The process of claim 1, wherein the polyacid comprises predominantly polyacrylic acid having a molecular weight not greater than about 200,000.

3. The process of claim 2, wherein the polyacrylic acid concentration in said aqueous solution is about 5 to 50 percent by weight based on the polyacrylic acid and water and wherein the polyacrylic acid has a molecular weight of about 200 to 6000.

4. The process of claim 1, wherein the pH of the polyacid solution is adjusted to about 3.2 to 4 prior to said absorption step.

5. The process of claim 1, wherein the treatment to remove $SO_2$ from the absorbing solution comprises contacting said solution with $H_2S$ thereby to convert the $SO_2$ to sulfur.

6. The process of claim 5, wherein the polyacid is polyacrylic acid having a molecular weight not greater than about 6000, its concentration in the absorbing solution is about 10 to 30 percent by weight based on polyacrylic acid and water, and the pH of the solution is adjusted to about 3.2 to 4 prior to said absorption step.

* * * * *